(12) United States Patent
Atherton et al.

(10) Patent No.: US 12,332,631 B2
(45) Date of Patent: Jun. 17, 2025

(54) AGENT-BASED SLICING FOR 3D OBJECT MODELS

(71) Applicant: AUTODESK, INC., San Francisco, CA (US)

(72) Inventors: Evan Patrick Atherton, Castro Valley, CA (US); David Thomasson, Fairfax, CA (US); Maurice Ugo Conti, Muir Beach, CA (US); Heather Kerrick, Berkeley, CA (US); Nicholas Cote, San Francisco, CA (US); Hui Li, San Rafael, CA (US)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 18/629,686

(22) Filed: Apr. 8, 2024

(65) Prior Publication Data
US 2024/0255917 A1 Aug. 1, 2024

Related U.S. Application Data

(63) Continuation of application No. 17/015,000, filed on Sep. 8, 2020, now Pat. No. 11,953,879, which is a continuation of application No. 15/613,070, filed on Jun. 2, 2017, now Pat. No. 10,768,606.

(51) Int. Cl.
| G05B 19/4099 | (2006.01) |
| B22D 23/00 | (2006.01) |
| B33Y 50/00 | (2015.01) |
| B23K 9/04 | (2006.01) |

(52) U.S. Cl.
CPC ....... *G05B 19/4099* (2013.01); *B22D 23/003* (2013.01); *B33Y 50/00* (2014.12); *B23K 9/044* (2013.01); *G05B 2219/49023* (2013.01); *G06T 2219/008* (2013.01)

(58) Field of Classification Search
CPC ...... B22D 23/003; B23K 9/044; B33Y 50/00; G05B 19/4099; G05B 2219/49023; G06T 2219/008
USPC ................................................... 700/98, 119
See application file for complete search history.

(56) References Cited

U.S. PATENT DOCUMENTS

| 10,054,932 | B2 | 8/2018 | Bachrach et al. |
| 10,768,606 | B2 | 9/2020 | Atherton et al. |
| 11,014,306 | B2 * | 5/2021 | Wright ................. B29C 64/393 |
| 11,953,879 | B2 * | 4/2024 | Atherton ............... B25J 9/1679 |
| 2008/0204454 | A1 | 8/2008 | Laning et al. |

(Continued)

Primary Examiner — Chun Cao
(74) Attorney, Agent, or Firm — Artegis Law Group, LLP

(57) ABSTRACT

An agent engine allocates a collection of agents to scan the surface of an object model. Each agent operates autonomously and implements particular behaviors based on the actions of nearby agents. Accordingly, the collection of agents exhibits swarm-like behavior. Over a sequence of time steps, the agents traverse the surface of the object model. Each agent acts to avoid other agents, thereby maintaining a relatively consistent distribution of agents across the surface of the object model over all time steps. At a given time step, the agent engine generates a slice through the object model that intersects each agent in a group of agents. The slice associated with a given time step represents a set of locations where material should be deposited to fabricate a 3D object. Based on a set of such slices, a robot engine causes a robot to fabricate the 3D object.

21 Claims, 6 Drawing Sheets

(56) References Cited

U.S. PATENT DOCUMENTS

| | | |
|---|---|---|
| 2013/0191083 A1 | 7/2013 | Bachrach et al. |
| 2014/0253549 A1 | 9/2014 | Bachrach et al. |
| 2014/0257548 A1 | 9/2014 | Bachrach et al. |
| 2015/0321425 A1 | 11/2015 | Stava |
| 2016/0176117 A1 | 6/2016 | Lee et al. |
| 2016/0288425 A1 | 10/2016 | Yoshida |
| 2017/0038765 A1 | 2/2017 | Yoshida |
| 2017/0052516 A1 | 2/2017 | Minardi et al. |
| 2018/0001566 A1* | 1/2018 | Morovic ................ H04N 1/405 |
| 2018/0189008 A1 | 7/2018 | Yuan et al. |
| 2018/0307206 A1 | 10/2018 | Atherton et al. |
| 2018/0307207 A1 | 10/2018 | Atherton et al. |

* cited by examiner

AGENT-BASED SLICING FOR 3D OBJECT MODELS

CROSS-REFERENCE TO RELATED APPLICATIONS

This application is a continuation of the co-pending U.S. patent application titled, "AGENT-BASED SLICING FOR 3D OBJECT MODELS," filed on Sep. 8, 2020 and having Ser. No. 17/015,000, which is a continuation of U.S. patent application titled, "AGENT-BASED SLICING," filed on Jun. 2, 2017 and having Ser. No. 15/613,070, now U.S. Pat. No. 10,768,606. The subject matter of these related applications is hereby incorporated herein by reference.

BACKGROUND OF THE INVENTION

Field of the Invention

Embodiments of the present invention relate generally to robotics and, more specifically, to agent-based slicing.

Description of the Related Art

A three-dimensional (3D) printer is a device for fabricating real-world 3D objects based on simulated 3D models. To fabricate a 3D object, a software application known as a "slicer" processes the 3D model to generate a set of slices. A slice is a two-dimensional (2D) section of the 3D model. The slicer generates each slice by computing the intersection between a 2D plane and the 3D model at a specific depth along a vertical axis associated with the 3D model. A given slice thus indicates a set of X, Y, and Z coordinates where the 3D object should occupy space. Taken as a whole, the set of slices represents the topology of the 3D object. The 3D printer may then fabricate the 3D object by depositing a layer of material for each slice in the set of slices.

One problem with the approach described above is that many types of 3D objects have geometries that are ill suited for the slicing operations performed by conventional slicers. In particular, geometries that include overhangs generally produce slices that cannot be fabricated without adding support structures. Another problem is that conventional slicers are limited to horizontal, planar slicing operations that are based on the mechanical constraints of typical 3D printers. Consequently, conventional slicers have limited utility when used with 3D printers that are not subject to those typical constraints.

As the foregoing illustrates, what is needed in the art are more effective techniques for slicing 3D objects.

SUMMARY OF THE INVENTION

Various embodiments of the present invention set forth a computer-implemented method for slicing object models, including deploying a group of agents onto a surface of an object model, causing the group of agents to traverse the surface of the object model towards a first region, where the group of agents surrounds a first portion of the object model, the first portion being located proximate to or at the first region, and generating a first slice that intersects the group of agents and the first portion of the object model.

At least one advantage of the techniques described above is that object model slices can be generated that follow the contour of the object model. Accordingly, a robot can more effectively fabricate a 3D object that resembles the object model with limited or no dependence on support structures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
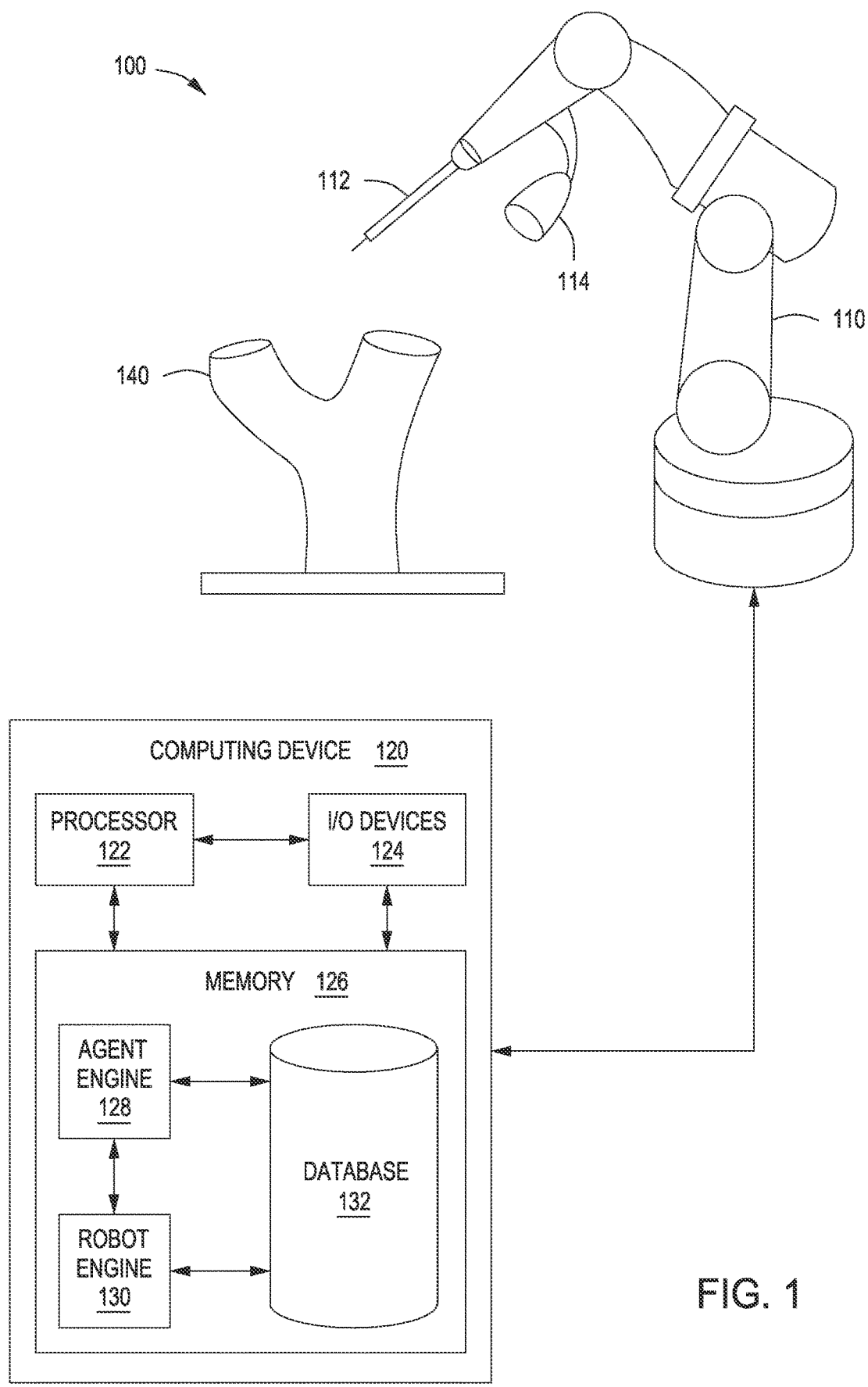
FIG. 1 illustrates a system configured to implement one or more aspects of the present invention.

FIG. 1 illustrates a system configured to implement one or more aspects of the present invention. As shown, robot system 100 includes a robot 110 coupled to a computing device 120. Robot 110 is configured to fabricate a three dimensional (3D) object 140.

Robot 110 includes a fabrication tool 112 and an optical device 114. Fabrication tool 112 may be any technically feasible implement capable of fabricating 3D objects, including, for example, a material deposition tool, a fused-filament device, and metal-inert gas (MIG) welder, and so forth. Optical device 114 is a sensor configured to capture frames of video data related to the fabrication of 3D object 140. In practice, optical device 114 is a video camera, although other types of sensors fall within the scope of the present invention, including audio sensors, among others.

Computing device 120 is configured to coordinate the operation of robot 110. In doing so, computing device 120 receives various data signals from robot 110, including feedback signals, sensor signals, video frames from optical device 114, and so forth. Computing device 120 then processes those signals to generate commands for controlling robot 110. Computing device 120 includes a processor 122, input/output (I/O) devices 124, and a memory 126, as shown.

Processor 122 may be any technically feasible form of processing device configured to process data and execute program code. Processor 122 could be, for example, a central processing unit (CPU), a graphics processing unit (GPU), an application-specific integrated circuit (ASIC), a field-programmable gate array (FPGA), any technically feasible combination of such units, and so forth.

I/O devices 124 may include devices configured to receive input, including, for example, a keyboard, a mouse, and so forth. I/O utilities 124 may also include devices configured to provide output, including, for example, a display device, a speaker, and so forth. I/O utilities 124 may further include devices configured to both receive and provide input and output, respectively, including, for example, a touchscreen, a universal serial bus (USB) port, and so forth.

Memory 126 may include any technically feasible storage medium configured to store data and software applications. Memory 126 could be, for example, a hard disk, a random access memory (RAM) module, a read-only memory (ROM), and so forth. Memory 126 includes an agent engine 128, a robot engine 130, and a database 132. Agent engine 128 and robot engine 130 are software applications configured to interoperate with one another to coordinate fabrication of 3D object 140. In doing so, agent engine 128 generates a set of slices based on a model of 3D object 140. Robot engine 130 then causes robot 110 to fabricate 3D object 140 based on the set of slices. Agent engine 128 and robot engine 130 are described in greater detail below in conjunction with FIG. 2.

Figure 2:
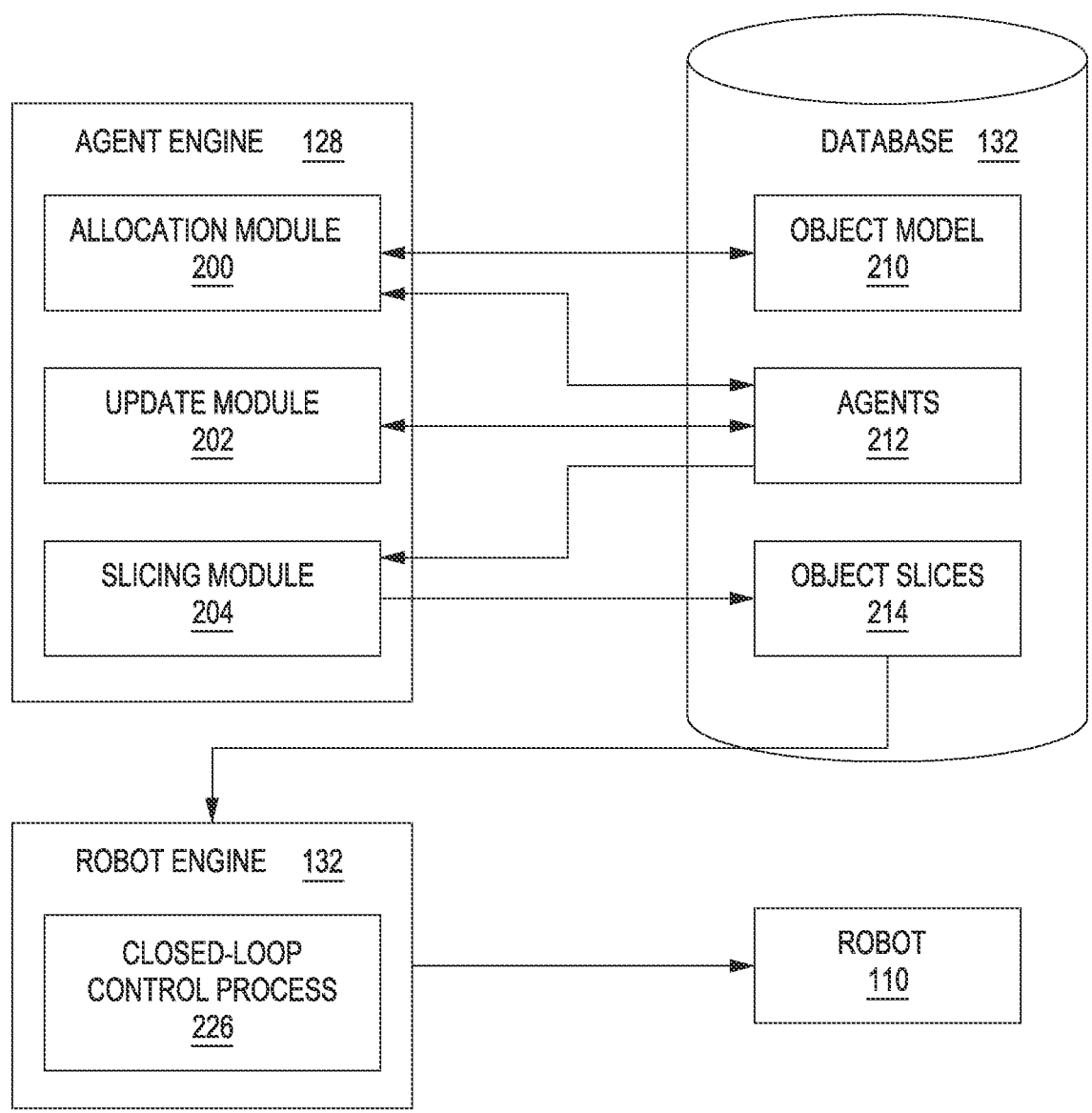
FIG. 2 is a more detailed illustration of the agent engine and robot engine of FIG. 1, according to various embodiments of the present invention.

FIG. 2 is a more detailed illustration of the agent engine and robot engine of FIG. 1, according to various embodiments of the present invention. As shown, agent engine 128 includes an allocation module 200, an update module 202, and a slicing module 204. Database 132 includes an object model 210, agents 212, and object slices 214. Robot engine 130 includes a closed-loop control process 220.

In operation, allocation module 200 processes object model 210 and allocates agents 212 based on geometry associated with that model. Object model 210 may be any technically feasible representation of 3D object 140, including a computer-aided design (CAD) model, a parametric model, and so forth. Agents 212 include a set of autonomous software entities configured to traverse the surface of object model 210, as described in greater detail below. Update module 202 updates agents 212 to implement the traversal of object model 210 according to various predefined behaviors and behavioral parameters associated with agents 212. Slicing module 204 generates object slices 214 based on the positions of agents 212 relative to the surface of object model 210 at different points in time. Each object slice 214 includes a collection of 3D coordinates where material should be placed to fabricate 3D object 140. Based on object slices 214, robot engine 130 executes closed-loop control process 220 to cause robot 110 to deposit material onto 3D object 140 corresponding to each object slice 214. This process is described in greater detail by way of example in conjunction with FIGS. 3-6.

Exemplary Agent-Based Slicing

Figure 3:
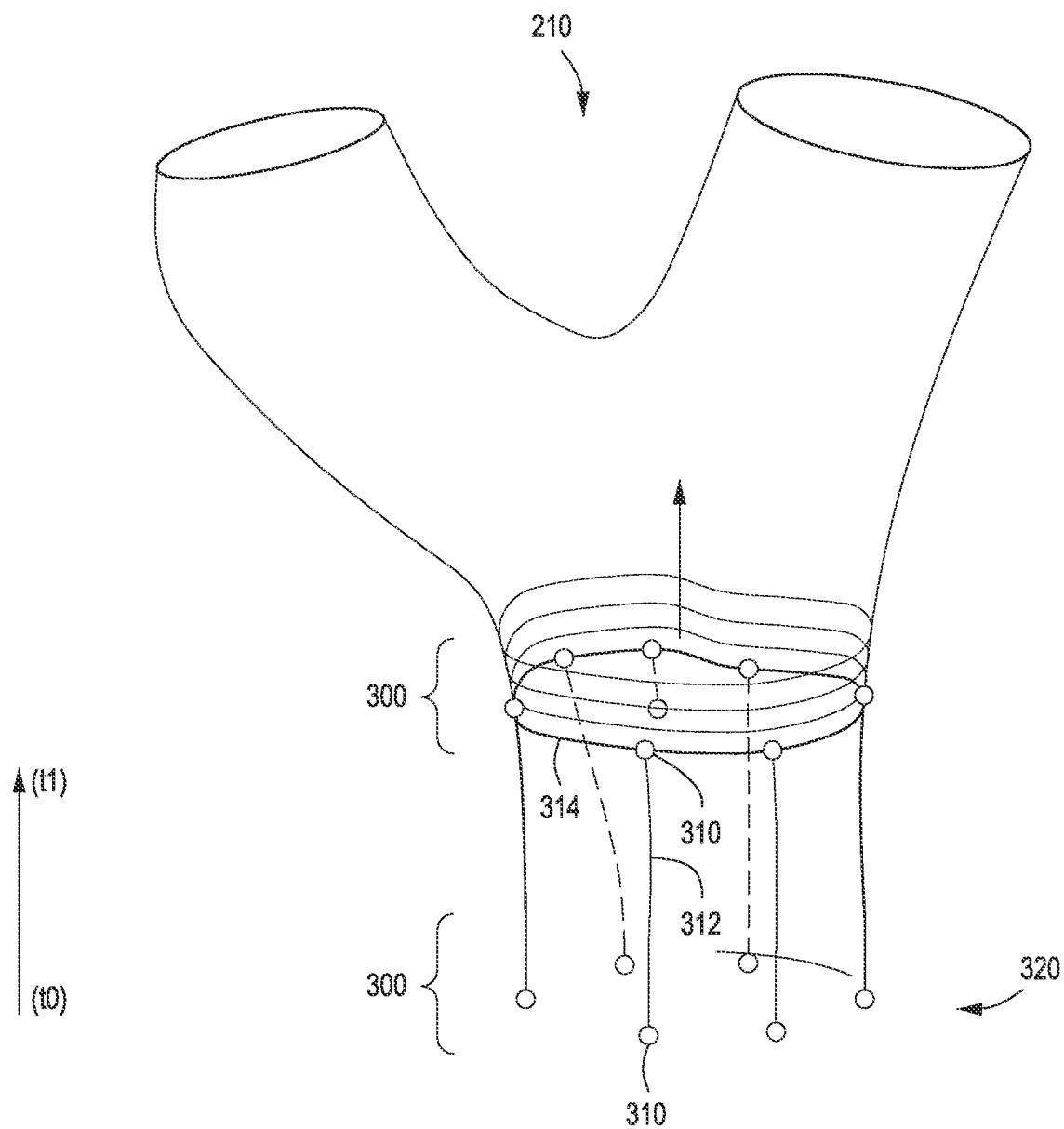
FIG. 3 illustrates a set of agents traversing an object model, according to various embodiments of the present invention.

FIG. 3 illustrates a set of agents traversing an object model, according to various embodiments of the present invention. As shown, a group 300 of agents 212 are disposed on the surface of object model 210. In the example shown, object model 210 is a tree-like structure that represents 3D object 140 of FIG. 1. Initially, at time step t0, allocation module 200 positions agents 212 in group 300 at the bottom of trunk 320 of object model 210. In doing so, allocation module 200 assigns each agent both a 3D (x, y, z) location on the surface of object model 210 as well as a 3D orientation (x, y, z) on that surface. The location and orientation associated with a given agent may be referred to as the "pose" of the agent. From time step t0 to t1, update module 202 causes each agent 212 in group 300 to ascend trunk 320 along a separate path. For example, agent 310 ascends along path 312.

At time step t1, slicing module 204 generates slice 314. Slice 314 intersects all agents 212 in group 300. In generating slice 314, slicing module 204 may perform an interpolation procedure to generate a smooth section across trunk 320 where agents 212 in group 300 define the edges of that section. Slicing module 204 includes slice 314 within object slices 214. Over subsequent time steps, update module 202 causes agents 212 in group 300 to ascend additional portions of object model 210, as described in greater detail below in conjunction with FIG. 4.

Figure 4:
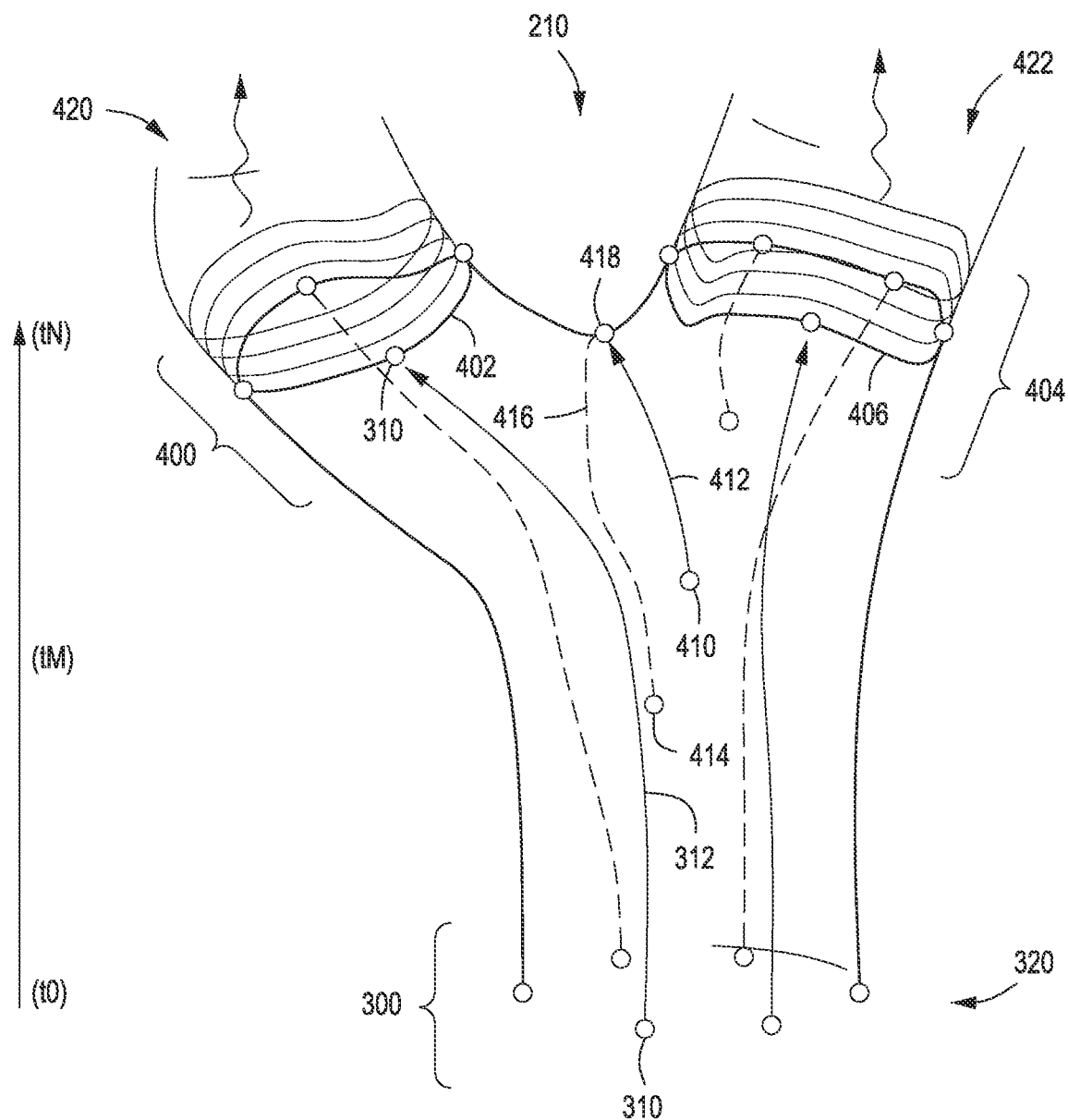
FIG. 4 illustrates a set of agents traversing the branches of the object model of FIG. 3, according to various embodiments of the present invention.

FIG. 4 illustrates a set of agents traversing branches of the object model of FIG. 3, according to various embodiments of the present invention. As shown, trunk 320 of object model 210 separates to form branches 420 and 422. From time step t0 to time step tN, update module 202 causes agents 212 in group 300 to ascend object model 210. When group 300 reaches branches 420 and 422, group 300 divides to form subgroups 400 and 404. The division of group 300 may occur as an emergent behavior of agents 212, and need not be explicitly programmed to occur. Subgroups 400 and 404 of agents 212 then ascend along branches 420 and 422, respectively, in relative separation from one another. At time step tN, slicing engine 206 generates slice 402 of branch 420. Slice 402 intersects each agent 212 within subgroup 400. Likewise, at time step tN, slicing engine 206 generates slice 406 of branch 422. Slice 406 intersects each agent within subgroup 404. Slicing engine 206 includes slices 402 and 406 into object slices 214.

Update module 202 and slicing engine 206 may proceed in the above-described manner over many time steps until object slices 214 provides a sufficient topological model for fabricating 3D object 140. The sufficiency of that model could depend on, for example, a desired resolution for 3D object 140 or mechanical constraints associated with robot 110. Robot engine 130 may then cause robot 110 to fabricate 3D object 140 based on object slices 214, as previously described.

During the ascension of object model 210, update module 202 causes agents 212 to implement swarm-like behavior whereby each agent 212 performs specific actions based on the presence and proximity of other nearby agents as well as the behaviors of those nearby agents. In particular, at each time step and for a given agent 212, update module 202 first identifies a number of other agents within a neighborhood around the agent 212. Update module 202 then determines a heading vector associated with each neighboring agent, and computes an influence vector based on the collective heading vectors of the neighboring agents. Based on the influence vector and based on a previous heading vector associated with the agent 212, update module 202 generates a new heading vector for the agent 212. Update module 202 then causes the agent 212 to ascend object model 210 based on the heading vector and, in some embodiments, based on various other parameters associated with the agent 212. With this approach, update module 202 may cause a given agent 212 to avoid other agents and maintain a personal territory with a limited number of nearby agents.

In addition, during the ascension of object model 210, update module 202 may also generate new agents 212. For example, in FIG. 4, update module 202 generates new agents 410 and 414 at time tM. Update module 202 could generate a new agent when the number or density of agents within a certain surface region of object model 210 falls beneath a first threshold value. As shown, new agent 410 ascends along path 412, and new agent 414 ascends along path 416. Update module 202 may also generate new agents by dividing a pre-existing agent into two new agents.

Update module 202 may also cause two or more agents to merge with one another. For example, at time tN, update module 202 causes agents 410 and 414 to merge into agent 418. Update module 202 may cause any two or more agents to merge with one another when the number or density of agents within a certain surface region of object model 210 exceeds a second threshold value. Update module 202 may merge two agents by simply eliminating one of the two agents. However, update module 202 may also eliminate agents without performing any agent merging.

By merging and dividing agents 212 in the manner described above, update module 202 maintains a relatively consistent distribution of agents 212 across the surface of object model 210 at any given time step. This distribution allows slicing module 204 to generate object slices 214 with a configurable degree of consistency. In turn, robot 110 may fabricate 3D object 140, based on those slices, with configurable precision.

To implement the various behaviors of agents 212 described above, update module 202 modifies data associated with each agent. In some embodiments, agent data is included in class variables associated with an agent class. Exemplary agent data is tabulated below in Table 1:

TABLE 1

| Data type | Name of data | Description of data |
|---|---|---|
| Guid | SelfID | ID for agent |
| Guid | GroupID | ID for enclosing group |
| List<Guid> | NeighborIDs | ID(s) of neighbors nearby |
| int | SurfaceIndex | Index of local surface |
| Surface | LocalSurface | Local surface geometry |
| Coordinate System | WorldPose | Coordinate and orientation with respect to world |
| UV | SurfacePose | Coordinate with respect to local surface |
| double | ToleranceRadius | Radius of personal space for agent |
| double | ToleranceWeight | Avoidance factor for other agents |
| UV | ClimbVector | Direction of travel on local surface |
| double | ClimbRate | Step size within UV of local surface |
| int | ClimbStamina | Amount of steps that may be taken |
| double | ClimbJitter | Randomness of steps |
| bool | MayContinue | Check for whether agent is available |

According to Table 1, SelfID, GroupID, and NeighborIDs, and SurfaceIndex are various identifiers that identify a particular agent 212, a group of agents (such as group 300) to which the agent 212 belongs, identifiers associated with neighboring agents 212, and the index of a surface region of object model 210, respectively. LocalSurface includes geometry of object model 210 in the vicinity of the agent 212. WorldPose is the global position and orientation of the agent 212, while SurfacePose is the local position and orientation of the agent 212 in a UV coordinate frame. ToleranceRadius defines an area surrounding the agent 212 within which the influence vector discussed above may be calculated, while ToleranceWeight defines a weighting for that influence vector. ClimbVector is a direction of travel in UV coordinates along LocalSurface. ClimbRate defines a size of step the agent 212 travels, while ClimbStamina defines the number of steps the agent 212 takes. ClimbJitter is a randomness factor that can be applied to ClimbVector. MayContinue dictates whether the agent 212 may continue ascending object model 210.

Update module 202 is configured to process the above agent data for each agent during each time step in order to cause agents 212 to collectively map the surface of object model 210 to generate object slices 214. Object slices 214 generated in this manner advantageously trace the contours of object model 210 and therefore allow robot 110 to more effectively fabricate 3D objet 140. By contrast, prior art slicing techniques simply create horizontal slices that do not follow object contours, as described by comparison in conjunction with FIG. 5.

Figure 5:
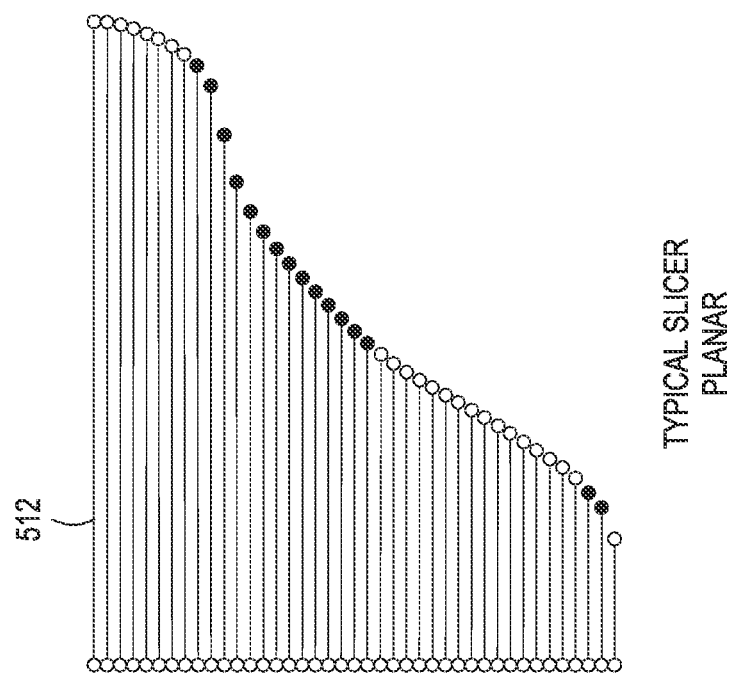
FIG. 5 illustrates a set of slices generated using the agent-based approach described in conjunction with FIGS. 1-4, according to various embodiments of the present invention.
Figure 5:
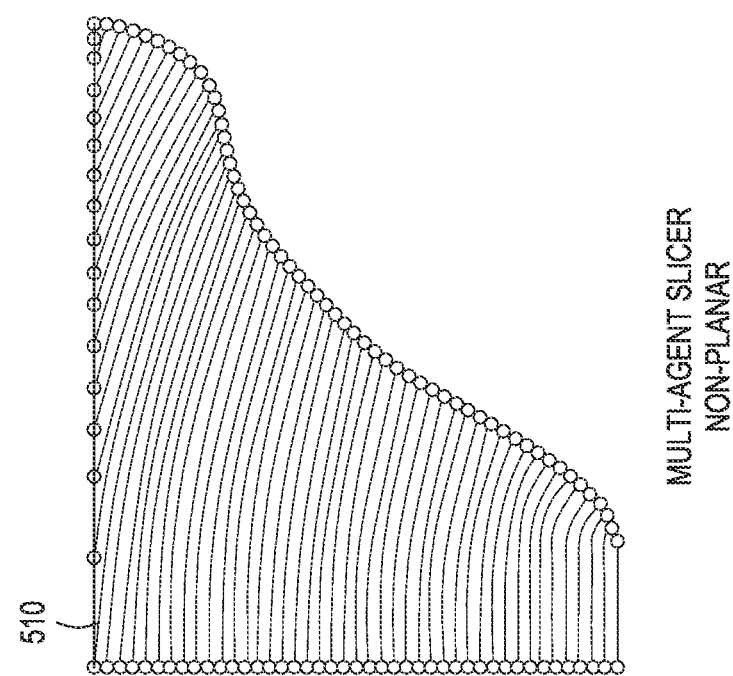
Figure 5:
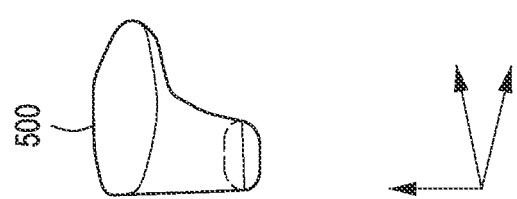

FIG. 5 illustrates a set of slices generated using the agent-based approach described in conjunction with FIGS. 1-4, according to various embodiments of the present invention. As shown, an object model 500 can be sliced using the agent-based approach discussed herein to generate object slices 510. Each object slice 510 is non-planar and generally follows surface contours of object model 500. With this approach, robot 110 may fabricate a physical version of object model 500 without support structures or with only limited need for support structures.

Object model 500 may also be sliced using a typical slicing approach to generate object slices 512. Each object slice 512 is horizontal and planar and does not vary based on the contour of object model 500. To fabricate a physical version of object model 500 based on object slices 512, robot 110 requires support structures to support overhanging material layers. Accordingly, one of the advantages of the agent-based approach is that portions of 3D objects having overhangs can more easily be fabricated with slices generated via agents. The agent-based approach discussed thus far is described in stepwise fashion below in conjunction with FIG. 6.

Agent-Based Slicing Procedure

Figure 6:
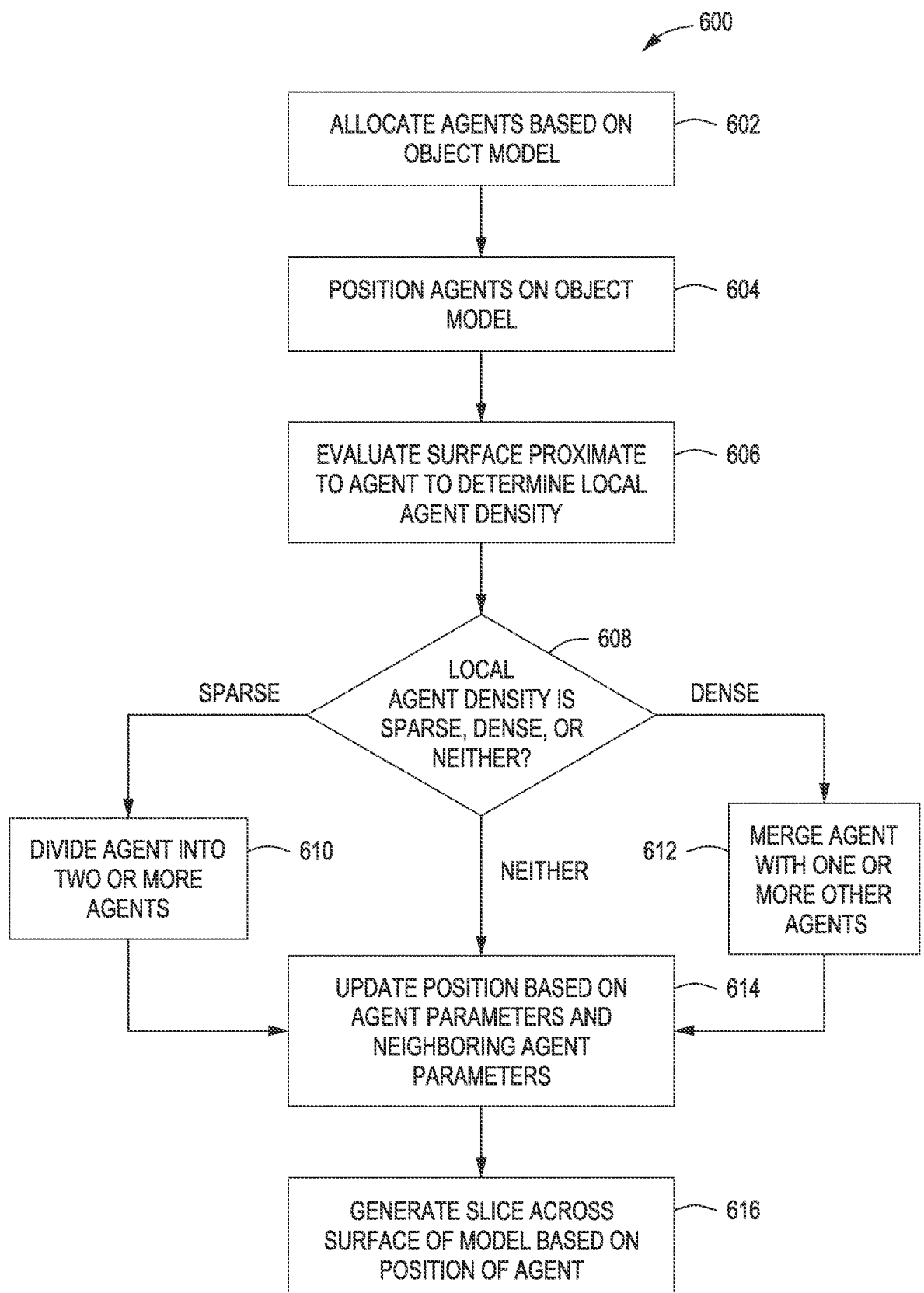
FIG. 6 is a flow diagram of method steps for slicing an object model using a set of agents, according to various embodiments of the present invention.

FIG. 6 is a flow diagram of method steps for slicing an object model using a set of agents, according to various embodiments of the present invention. Although the method steps are described in conjunction with the systems of FIGS. 1-5, persons skilled in the art will understand that any system configured to perform the method steps, in any order, is within the scope of the present invention.

As shown, a method 600 begins at step 602, where allocation module 200 within agent engine 128 allocates agents 212 based on object model 210. Allocation engine 200 may determine a number of agents to initially allocate based on the geometry of object model 210, a resolution parameter for generating object slices 214, or other factors. At step 604, allocation engine 200 positions the allocated agents 212 on the surface of object model 210. In doing so, allocation engine 200 may assign a 3D pose to each agent.

At step 606, update engine 202 evaluates the surface of object model 210 proximate to the agent 212 to determine a local agent density. At step 608, update engine 202 determines whether the local agent density is sparse, dense, or somewhere in between.

In one embodiment, update engine 202 maintains two thresholds, a sparsity threshold and a density threshold, where the density threshold exceeds the sparsity threshold. If the local agent density falls beneath the sparsity threshold, update engine 202 considers the local agent density to be sparse. If the local agent density exceeds the density threshold, then update engine 202 considers the local agent density to be dense. Otherwise, if the local agent density falls between the two thresholds, then update engine 202 considers the local agent density to be neither sparse nor dense.

If at step 608 update engine 202 determines that the local agent density is sparse, then the method proceeds to step 610 where update agent 202 divides the agent 212 into two agents, thereby generating a new agent. The method then proceeds to step 614. If at step 608 update engine 202 determines that the local agent density is neither sparse nor dense, then the method proceeds directly to step 614. If at step 608 update engine 202 determines that the local agent density is dense, then the method proceeds to step 612, where update engine 202 merges the agent 212 with one or more neighboring agents. The method then proceeds to step 614.

At step 614, update engine 202 updates the position of the agent 212 and other agent-oriented data based on agent parameters and neighboring agent parameters. In doing so, update engine 202 may compute an influence vector based on neighboring agents and then determine an updated heading vector for the agent 212 based on the influence vector. Update engine 202 then causes the agent 212 to ascend based on that new heading vector. Update engine 202 may perform steps 608 through 614 for all agents 212.

At step 616, slicing engine 204 generates a slice across the surface of object model 210 based on the position of the agent 212 and neighboring agents within the same group as agent 212. Slicing engine 204 may repeat step 616 for different subgroups, in the manner shown in FIG. 4. In one embodiment, each agent represents a material deposition location, and the slice generated at step 616 reflects a set of locations where material should be deposited to fabricate 3D object 140.

In sum, an agent engine allocates a collection of agents to scan the surface of an object model. Each agent operates autonomously and implements particular behaviors based on the actions of nearby agents. Accordingly, the collection of agents exhibits swarm-like behavior. Over a sequence of time steps, the agents traverse the surface of the object model. Each agent acts to avoid other agents, thereby maintaining a relatively consistent distribution of agents across the surface of the object model over all time steps. At a given time step, the agent engine generates a slice through the object model that intersects each agent in a group of agents. The slice associated with a given time step represents a set of locations where material should be deposited to fabricate a 3D object. Based on a set of such slices, a robot engine causes a robot to fabricate the 3D object.

At least one advantage of the techniques described above is that object model slices can be generated that follow the contour of the object model. Accordingly, a robot can more effectively fabricate a 3D object that resembles the object model with limited or no dependence on support structures. In addition, the agent-based slicing approach may generate non-planar slices, thereby allowing a 6-axis robotic deposition tool to operate across all degrees of freedom.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for slicing object models, the method comprising:
positioning a plurality of software agents on an object model;
evaluating a surface of the object model proximate to a first software agent included in the plurality of software agents to determine a local density of software agents;
determining whether the local density of software agents is sparse, dense, or neither;
causing the first software agent to move to an updated position on the object model; and
generating a slice across the surface of the object model based on the updated position of the first software agent.

2. The computer-implemented method of claim 1, wherein the local density of software agents is determined to be sparse, and further comprising, in response, generating a new software agent.

3. The computer-implemented method of claim 2, wherein generating the new software agent comprises dividing the first software agent into two new agents.

4. The computer-implemented method of claim 1, wherein the local density of software agents is determined to be dense, and further comprising, in response, eliminating at least one software agent included in the plurality of software agents.

5. The computer-implemented method of claim 4, wherein eliminating the at least one software agent comprises merging the first software agent with another software agent that also is included in the plurality of software agents.

6. The computer-implemented method of claim 1, wherein determining whether the local density is sparse comprises comparing a number of software agents located on the surface of the object model proximate to the first software agent is below a first threshold value.

7. The computer-implemented method of claim 6, wherein determine whether the local density is dense comprises comparing the number of software agents located on the surface of the object model proximate to the first software agent exceeds a second threshold value.

8. The computer-implemented method of claim 1, wherein causing the first software agent to move to an updated position on the object model comprises identifying a number of software agents within a neighborhood around the first software agent, and determining a heading vector associated with each software agent included in the number of software agents.

9. The computer-implemented method of claim 8, wherein causing the first software agent to move to the updated position further comprises computing an influence vector based on the heading vectors, computing a new heading vector for the first software agent based the influence vector and an old heading vector for the first software agent, and causing the first software agent to move to the updated position based on the new heading vector.

10. The computer-implemented method of claim 1, wherein the slice includes a collection of three-dimensional coordinates where material should be placed to fabricate the object model.

11. One or more non-transitory computer-readable storage media storing instructions that, when executed by one or more processors, cause the one or more processors to perform the steps of:
positioning a plurality of software agents on an object model;
evaluating a surface of the object model proximate to a first software agent included in the plurality of software agents to determine a local density of software agents;
determining whether the local density of software agents is sparse, dense, or neither;
causing the first software agent to move to an updated position on the object model; and
generating a slice across the surface of the object model based on the updated position of the first software agent.

12. The one or more non-transitory computer-readable storage media of claim 11, wherein the slice includes a collection of three-dimensional coordinates where material should be placed to fabricate the object model.

13. The one or more non-transitory computer-readable storage media of claim 12, further comprising causing a robot to deposit material corresponding to the slice in order to fabricate a portion of the object model.

14. The one or more non-transitory computer-readable storage media of claim 11, wherein the slice intersects each software agent included in the plurality of software agents.

15. The one or more non-transitory computer-readable storage media of claim 11, wherein positioning the plurality of software agents on the object model comprises causing the software agents included in the plurality of software agents to implement swarm-like behaviour, wherein each given software agent included in the plurality of software agents performs one or more actions based on a presence and a proximity of other software agents included in the plurality of software agents that are near the given software agent.

16. The one or more non-transitory computer-readable storage media of claim 15, wherein each given software agent included in the plurality of software agents performs the one or more actions based on one or more behaviours of the other software agents included in the plurality of software agents that are near the given software agent.

17. The one or more non-transitory computer-readable storage media of claim 11, wherein the local density of software agents is determined to be sparse, and further comprising, in response, generating a new software agent.

18. The one or more non-transitory computer-readable storage media of claim 11, wherein the local density of software agents is determined to be dense, and further comprising, in response, eliminating at least one software agent included in the plurality of software agents.

19. The one or more non-transitory computer-readable storage media of claim 11, wherein determining whether the local density is sparse comprises comparing a number of software agents located on the surface of the object model proximate to the first software agent is below a first threshold value.

20. The one or more non-transitory computer-readable storage media of claim 19, wherein determine whether the local density is dense comprises comparing the number of software agents located on the surface of the object model proximate to the first software agent exceeds a second threshold value.

21. A system, comprising:
one or more memories that include instructions; and
one or more processor that are coupled to the one or more memories and, when executing the instructions, are configured to perform the steps of:
  positioning a plurality of software agents on an object model;
  evaluating a surface of the object model proximate to a first software agent included in the plurality of software agents to determine a local density of software agents;
  determining whether the local density of software agents is sparse, dense, or neither;
  causing the first software agent to move to an updated position on the object model; and
  generating a slice across the surface of the object model based on the updated position of the first software agent.

* * * * *